: US010309584B2

United States Patent
Johnson et al.

(10) Patent No.: US 10,309,584 B2
(45) Date of Patent: Jun. 4, 2019

(54) MULTI-DIRECTIONAL PIVOT APPARATUS WITH LOCKING MECHANISM

(71) Applicants: Ryan Johnson, Saint Augustine, FL (US); Tamas Oliser, Atlantic Beach, FL (US)

(72) Inventors: Ryan Johnson, Saint Augustine, FL (US); Tamas Oliser, Atlantic Beach, FL (US)

( * ) Notice: Subject to any disclaimer, the term of this patent is extended or adjusted under 35 U.S.C. 154(b) by 0 days.

(21) Appl. No.: 15/711,662

(22) Filed: Sep. 21, 2017

(65) Prior Publication Data
US 2019/0086027 A1 Mar. 21, 2019

(51) Int. Cl.
*F16M 13/02* (2006.01)
*F16B 2/06* (2006.01)

(52) U.S. Cl.
CPC .......... *F16M 13/022* (2013.01); *F16B 2/065* (2013.01); *F16M 2200/024* (2013.01); *F16M 2200/06* (2013.01)

(58) Field of Classification Search
CPC .......... F16M 13/022; F16M 2200/024; F16M 2200/06; F16B 2/065
USPC ............... 248/125.7, 415, 425, 183.1, 155.2, 248/231.61, 228.3, 229.24, 228.5, 230.5, 248/231.85, 311.2, 314, 221.11, 222.11, 248/222.12, 222.13, 225.11; 403/67, 71, 403/87, 97, 196, 234, 256
See application file for complete search history.

(56) References Cited

U.S. PATENT DOCUMENTS

| 5,752,687 | A | 5/1998 | Lynch | |
|---|---|---|---|---|
| 5,813,646 | A * | 9/1998 | Bartholomae | B63B 29/06 248/230.7 |
| 6,264,153 | B1 | 7/2001 | Ragner | |
| 6,390,427 | B1 * | 5/2002 | McConnell | B60N 3/103 248/228.3 |
| 6,409,411 | B1 * | 6/2002 | Crorey | B25J 15/0052 403/54 |
| 6,505,802 | B2 * | 1/2003 | Fowler | B60N 3/103 248/230.5 |
| 6,942,131 | B2 * | 9/2005 | Trautman | B62J 11/00 224/414 |
| 7,774,973 | B2 * | 8/2010 | Carnevali | A01K 97/10 248/276.1 |
| 8,636,319 | B1 | 1/2014 | Parker, Jr. | |
| 2009/0127420 | A1 * | 5/2009 | Skaggs | B60N 3/10 248/313 |
| 2016/0356415 | A1 * | 12/2016 | Moore | F16M 13/02 |

* cited by examiner

*Primary Examiner* — Muhammad Ijaz
(74) *Attorney, Agent, or Firm* — Lawrence J. Gibney, Jr.; Mitchell Ghaneie (57) ABSTRACT

The present invention is a device that is intended to secure objects to a pole or bar of various shapes and sizes while securely supporting an object. The object being supported may be a cup holder, cellphone holder or other mobile device holder, a flashlight holder or other object. The device provides an adjustable mounting clamp and an extension arm that are capable of pivoting in multiple directions and locking in each direction that it may pivot.

16 Claims, 12 Drawing Sheets

MULTI-DIRECTIONAL PIVOT APPARATUS WITH LOCKING MECHANISM

RELATED APPLICATIONS

The present nonprovisional patent application claims the benefit of the filing date under 35 U.S.C. § 119(e) of Provisional Patent Application Ser. No. 62/397,562 filed on Sep. 21, 2016.

FIELD OF THE INVENTION

This invention relates to providing a mount that can attach to a variety of shaped bars and pivot in multiple directions to hold or secure an object or separate device in the user's desired orientation.

BACKGROUND OF THE INVENTION

While there are many mounts for attaching items such as insulated cup holders, fishing poles, cameras, and other devices to a pole, none are able to secure items as safely and securely as the invention described and claimed herein. The issue with mounting a device to a pole is that the mount often slips, or if there is a joint within the mount, then the joint will slip due to vibration or bouncing of the object that the device is mounted to.

The present invention avoids the slipping issue by providing a serrated surface and lock washer in one embodiment and a plurality of serrated surfaces in another embodiment. In turn, a user can mount an object in the desired place and orientation on a bar without the mount slipping or sliding due to the weight of the object.

BRIEF SUMMARY OF THE INVENTION

The present invention pivots in multiple directions that is comprised of a locking slot pivot joint and an adjustable clamp, each of which move in perpendicular directions relative to each other. There is an extension arm and a pivot arm that connect together at the slot pivot joint. The other end of each arm connects to another object. For example, the end of the pivot arm may connect to a cup holder, cell phone holder, fishing pole or flashlight holder, among various other items. Also, the end of the extension arm is intended to connect to an adjustable mounting bracket with a serrated locking joint.

The extension arm has a hollow interior that allows for a bolt to protrude through. The bolt is placed into the extension arm's hollow interior, out of a through hole, then through a serrated surface on the extension arm, through the serrated surface on the second side of the adjustable mounting bracket, and through second side of the adjustable mounting bracket where a locknut is placed. As the bolt is tightened into the lock nut the serrated joint will be locked together and prevented from pivoting.

The adjustable mounting bracket intended to be mounted to a bar or tube of varying shape or size. The only required modification may be the size of bolts used with the mount.

NUMBERING REFERENCE

5—Device
10—First part of clamp
11a—First bolt
11b—Second bolt
12a—First lock nut
12b—Second lock nut
13a—First recess
13b—Second recess
15—Second part of clamp
16—Third lock nut
17—Washer
18—Third recess
20—Extension arm
21—Serrated locking joint
21a—First serrated surface
21b—Second serrated surface
22—Through-hole in first end of extension arm
23—Third bolt
25—Pivot arm
36—Contact surface
27a—Third serrated surface (Second Embodiment)
27b—Fourth serrated surface (Second Embodiment)
28a—Fifth serrated surface (Second Embodiment)
28b—Sixth serrated surface (Second Embodiment
30—Locking slot pivot joint
31—Fourth bolt
32—Fourth lock nut
33—Lock washer (First Embodiment)
34—Fourth recess
40—Cup holder
50—Bar

DETAILED DESCRIPTION OF THE EMBODIMENTS

The present invention is a widget that is comprised of an adjustable mounting clamp, an extension arm 20, a pivot arm 25, a serrated locking joint 21, and a locking slot pivot joint 30. The locking pivot joint and serrated locking joint together allow for the device 5 to be mounted to a bar of varying orientations and securely support an object as the user desires. For example, in FIGS. 11 and 12 the device is mounted to a horizontally oriented bar, while supporting a cup holder on the contact surface 26. Then in FIG. 13 the device 5 is mounted to a vertically oriented bar, while also supporting a cup holder.

Because the device 5 has multidirectional locking joints, it can alternatively mount successfully to a diagonally oriented bar and support a cup holder as well as various other items, such as, but not limited to, bottle openers, fishing poles, cell phones, cameras, and flashlights. The device 5 may support other objects depending on the user's desires. Accordingly, the contact surface 26 can be modified to allow for different connection arrangements with other objects. The adjustable mounting clamp is additionally capable of attaching directly to another object as well if the user determines that using the extension arm is not necessary.

This invention is claimed and described with two separate embodiments.

First Embodiment

In this first embodiment, the adjustable mounting clamp is comprised of a first part 10, a first bolt 11a, a second bolt 11b, a first lock nut 12a, a second lock nut 12b, a first recess 13a, a second recess 13b, a second part 15, a third recess 18, and a first serrated surface 21a. The recess areas of the present invention prevent the locknut from turning when its respective bolt is tightened into it. For instance, first recess 13a and second recess 13b secure the first lock nut 12a and second lock nut 12b respectively by preventing each lock nut from turning when the first bolt 11a and second bolt 11b are tightened into its respective nut. This requires that the user only need one tool to tighten the bolt into the lock nuts.

Figure 11:
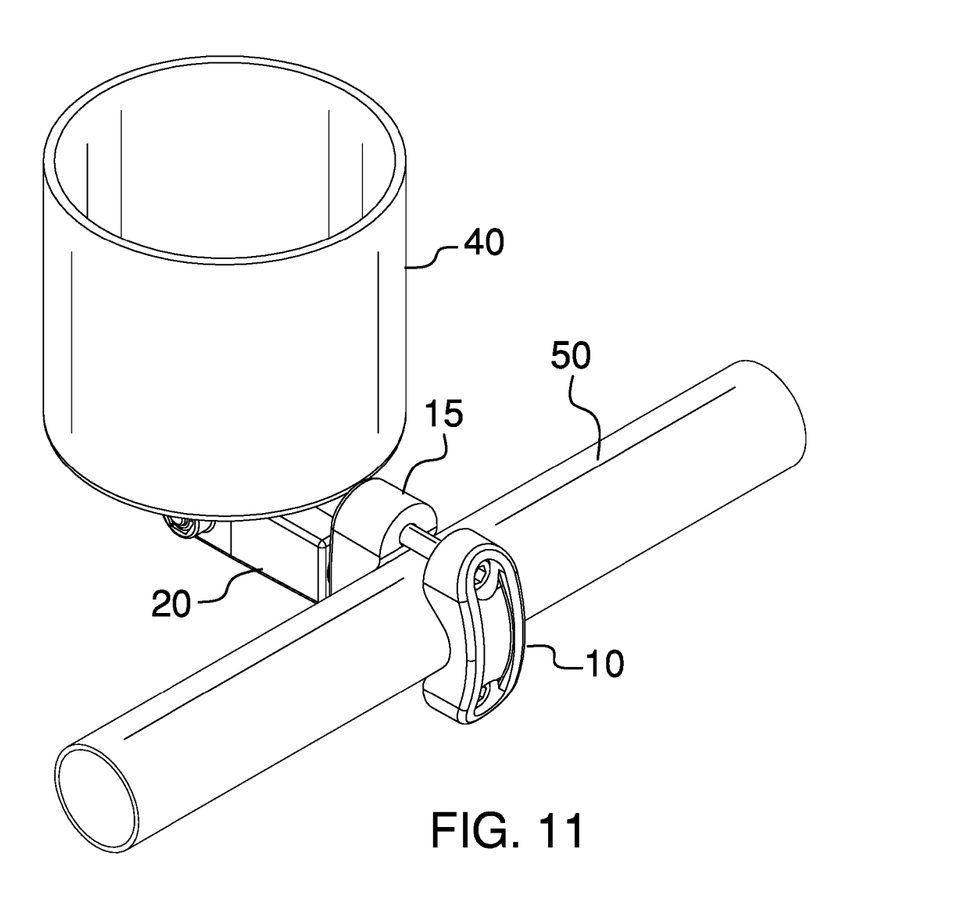
FIG. 11 is an in-use top isometric view of the device where the device is mounted to a horizontally oriented cylindrical bar and attached to a cup holder.
Figure 12:
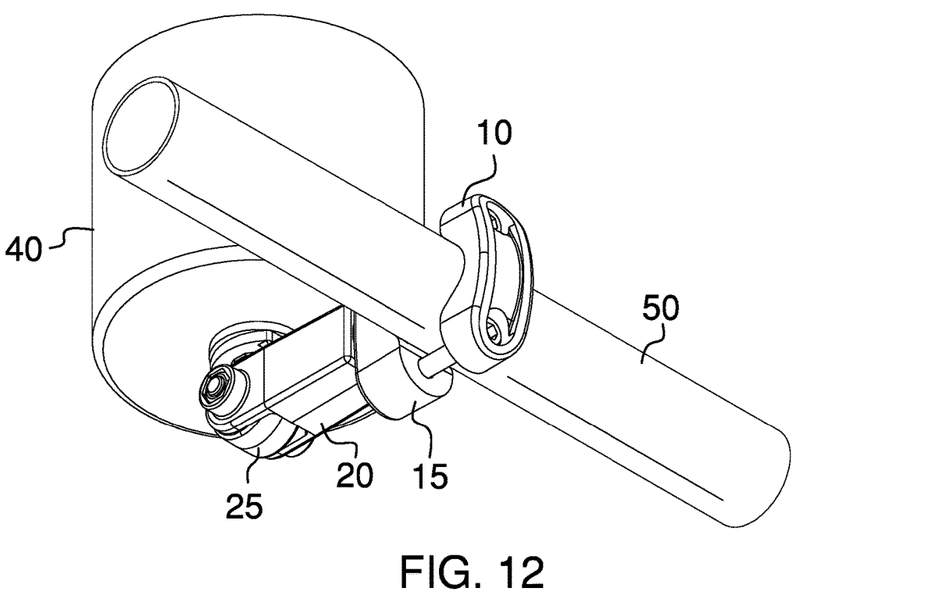
FIG. 12 is an in-use bottom isometric view of the device where the device is mounted to a horizontally oriented cylindrical bar and attached to a cup holder.
Figure 13:
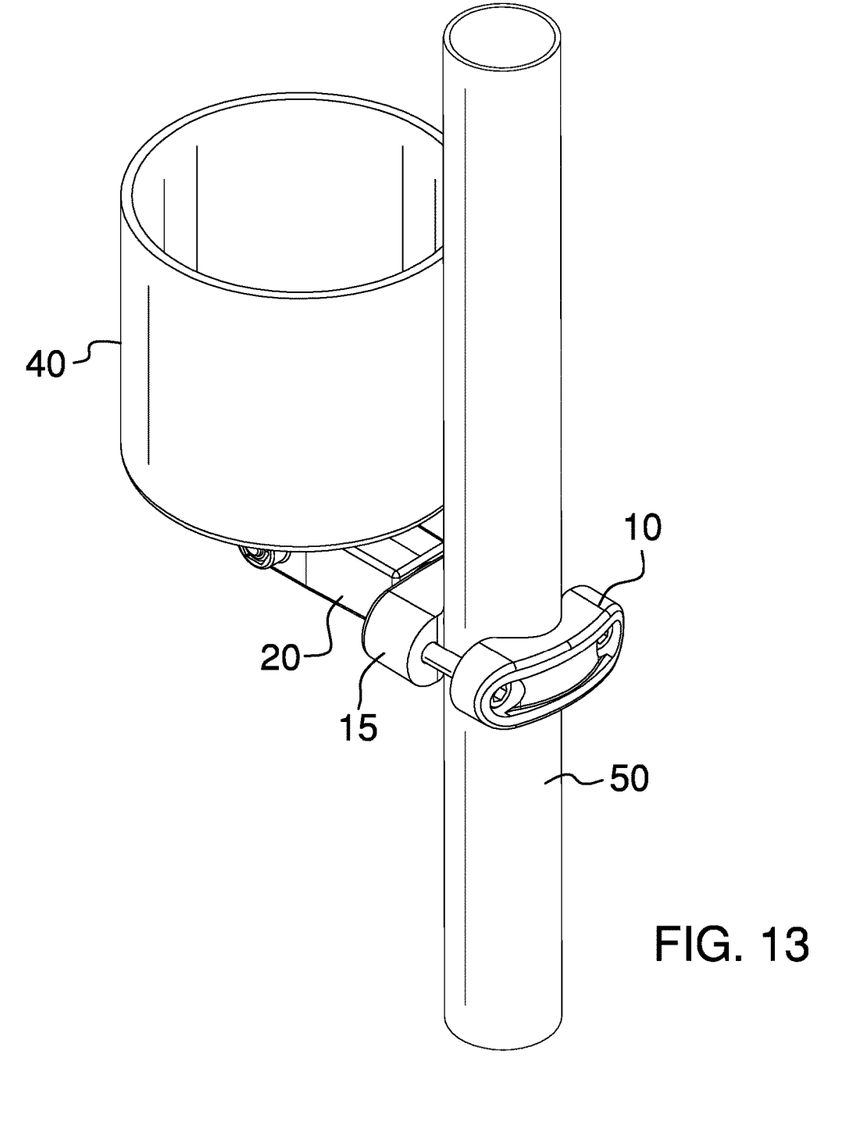
FIG. 13 is an in-use top isometric view of the device where the device is mounted to a vertically oriented cylindrical bar and attached to a cup holder.

The extension arm is comprised of a first arm 20, a second arm 25, a locking slot pivot joint 30, a second serrated surface 21b, and a contact point 26. The contact point 26 is intended to attach to another object, such as, but not limited to, a cup holder 40, as shown in FIG. 11, FIG. 12, and FIG. 13, a mobile electronic device holder, a fishing pole, or a flashlight.

Figure 7:
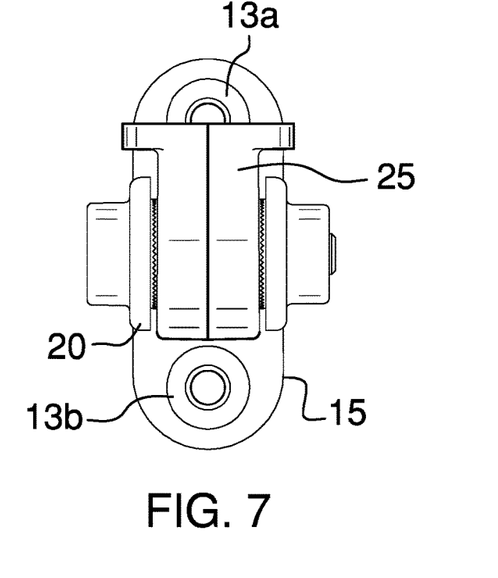
FIG. 7 is a front view of the second embodiment of the device.
Figure 8:
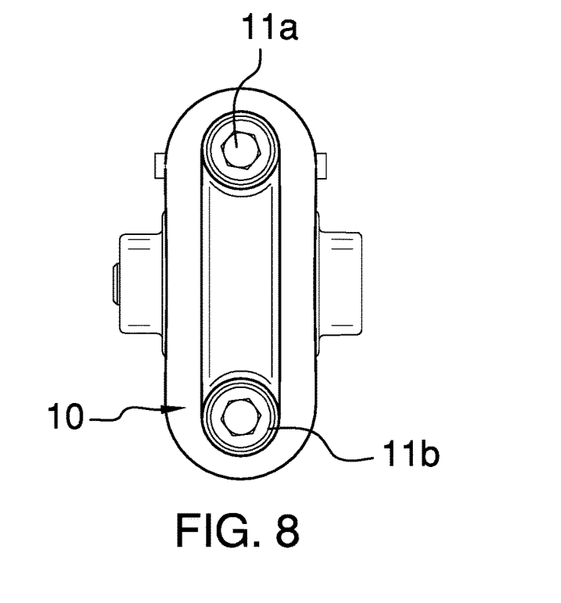
FIG. 8 is a back view of the device.

The first serrated surface 21a mates with the second serrated surface 21b. The two serrated surfaces are held together with a third bolt 23 and third lock nut 16, thereby creating a serrated locking joint 21. The third locking nut 16 is held in a third recess 18, which is located in the second part 15 of the adjustable mounting clamp. A washer 17 may also be incorporated as shown in FIG. 7. However, providing a washer 17 is not necessary.

Figure 1:
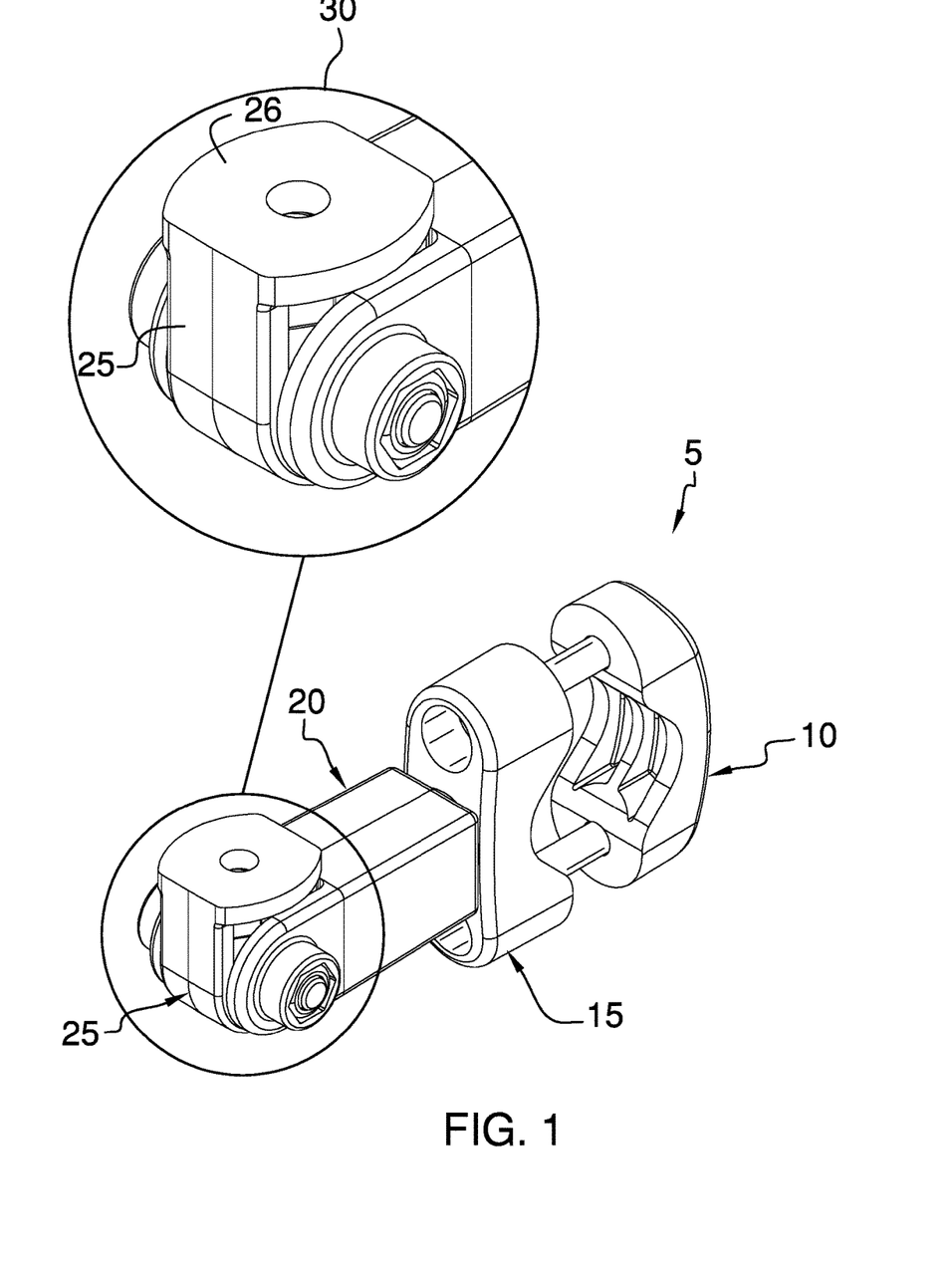
FIG. 1 is top front isometric view of the device.
Figure 2:
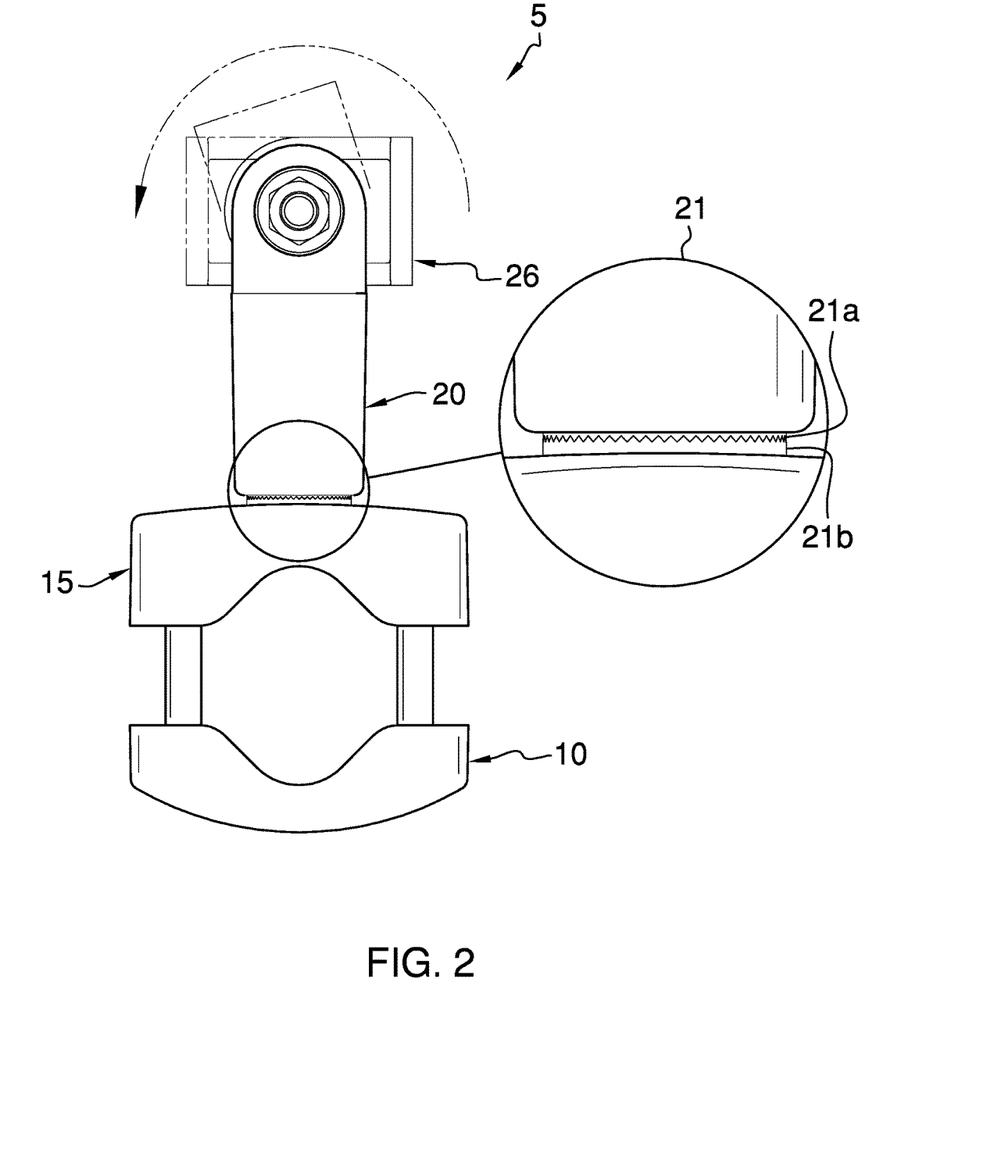
FIG. 2 is a side view of the device, which shows that the first arm can rotate.
Figure 3:
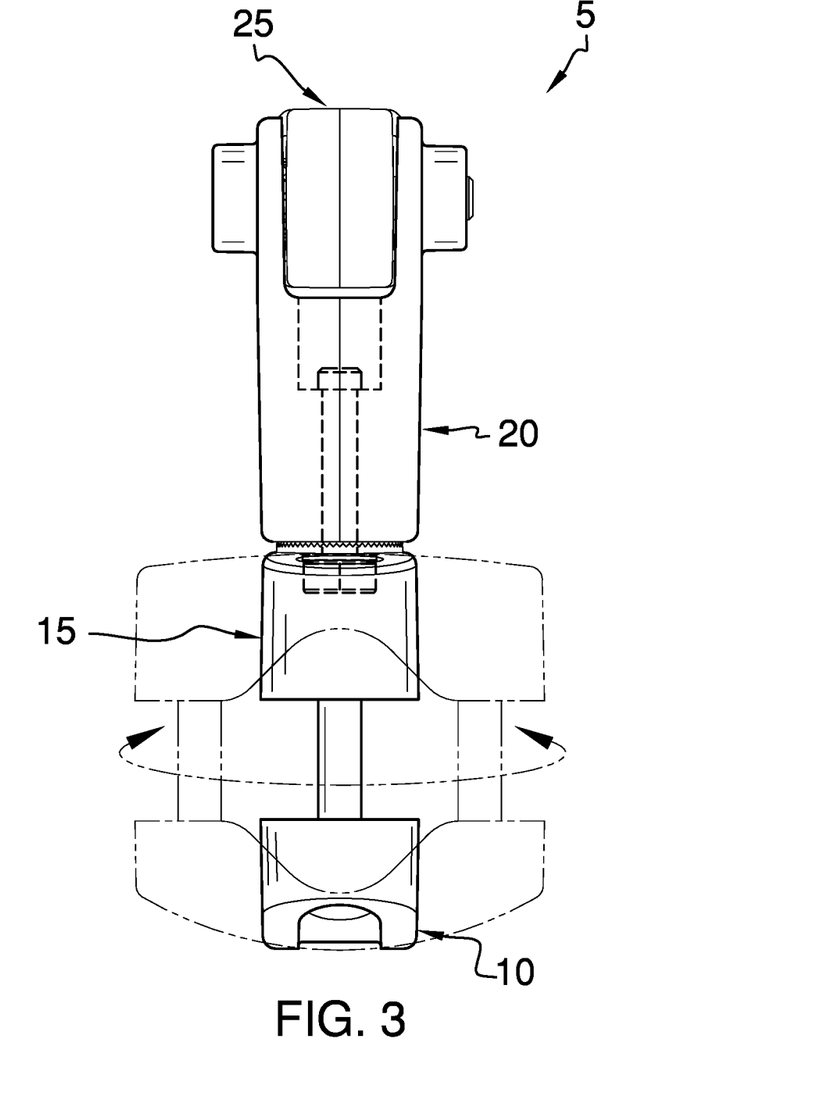
FIG. 3 is a bottom view of the first embodiment of the device, which shows that the adjustable mounting clamp can rotate.
Figure 9:
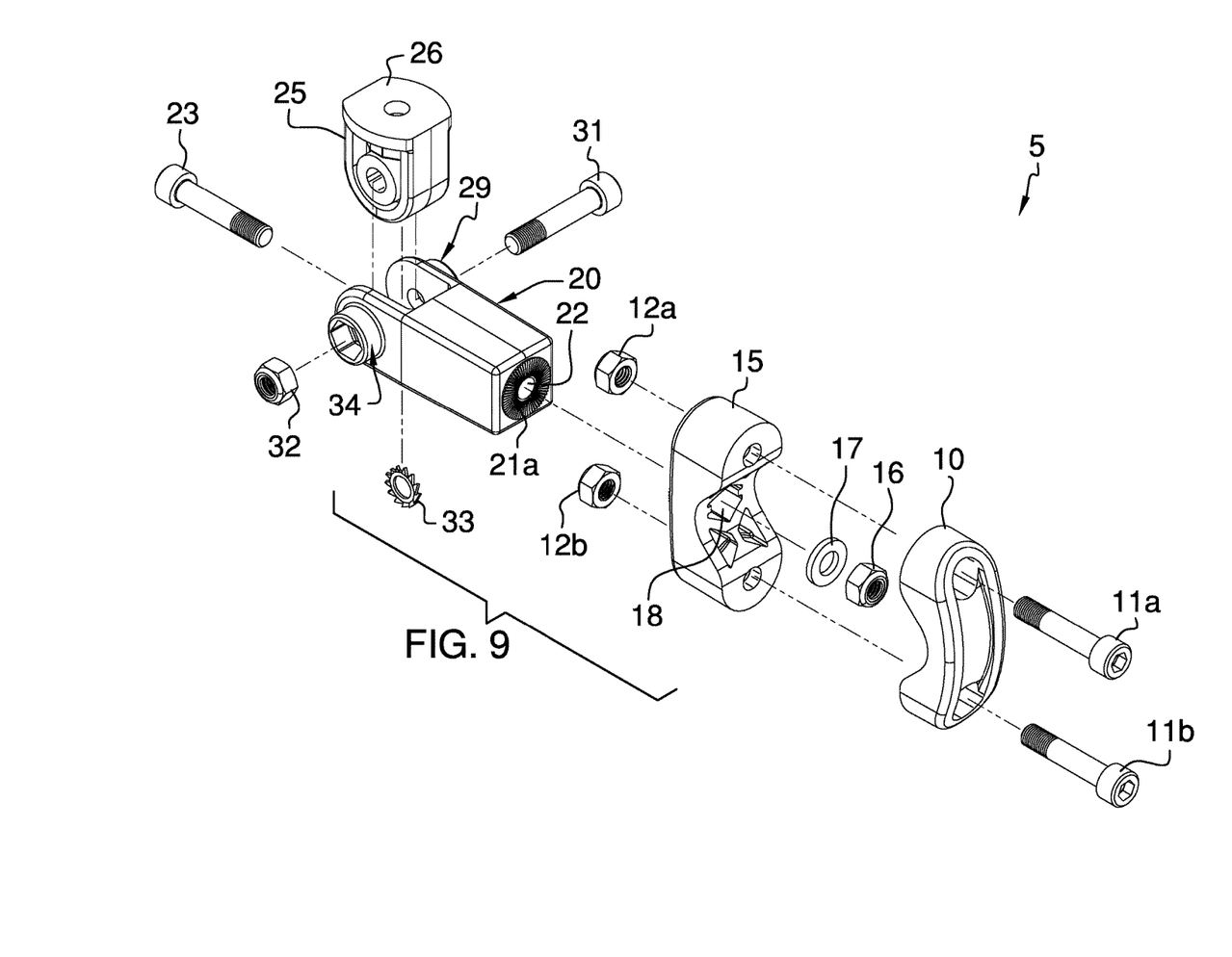
FIG. 9 is an exploded isometric view of the first embodiment of the device.

The extension arm 20 provides a hollow opening and a through-hole 22. The third bolt 23 will enter though the hollow opening and the threaded end will exit through the through-hole 22 and serrated surface 21a. The threaded region of the bolt 23 then follows through the serrated surface 21b and into the third recess 18 and locknut 16 as seen in FIG. 9. When the desired angle is placed between the adjustable mounting clamp and the extension arm 20 the third bolt 23 is to be tightened. Once the bolt 23 is tightened the serrated locking joint 21 is then locked in place, which can be seen in FIG. 2 and FIG. 3.

The locking pivot joint 30 is further comprised of the extension arm 20 and pivot arm 25 joining together with a fourth bolt 31, fourth lock nut 32, and a lock washer 33 as shown in FIG. 9. The fourth lock nut 32 is secured in a fourth recess 34. When the desired angle is set between the pivot arm 25 and the extension arm 20 the bolt 31 is to be tightened into thee lock nut 32, thereby, compressing the lock washer 33 and enhancing the locking force of the locking pivot joint 30.

Second Embodiment

Figure 10:
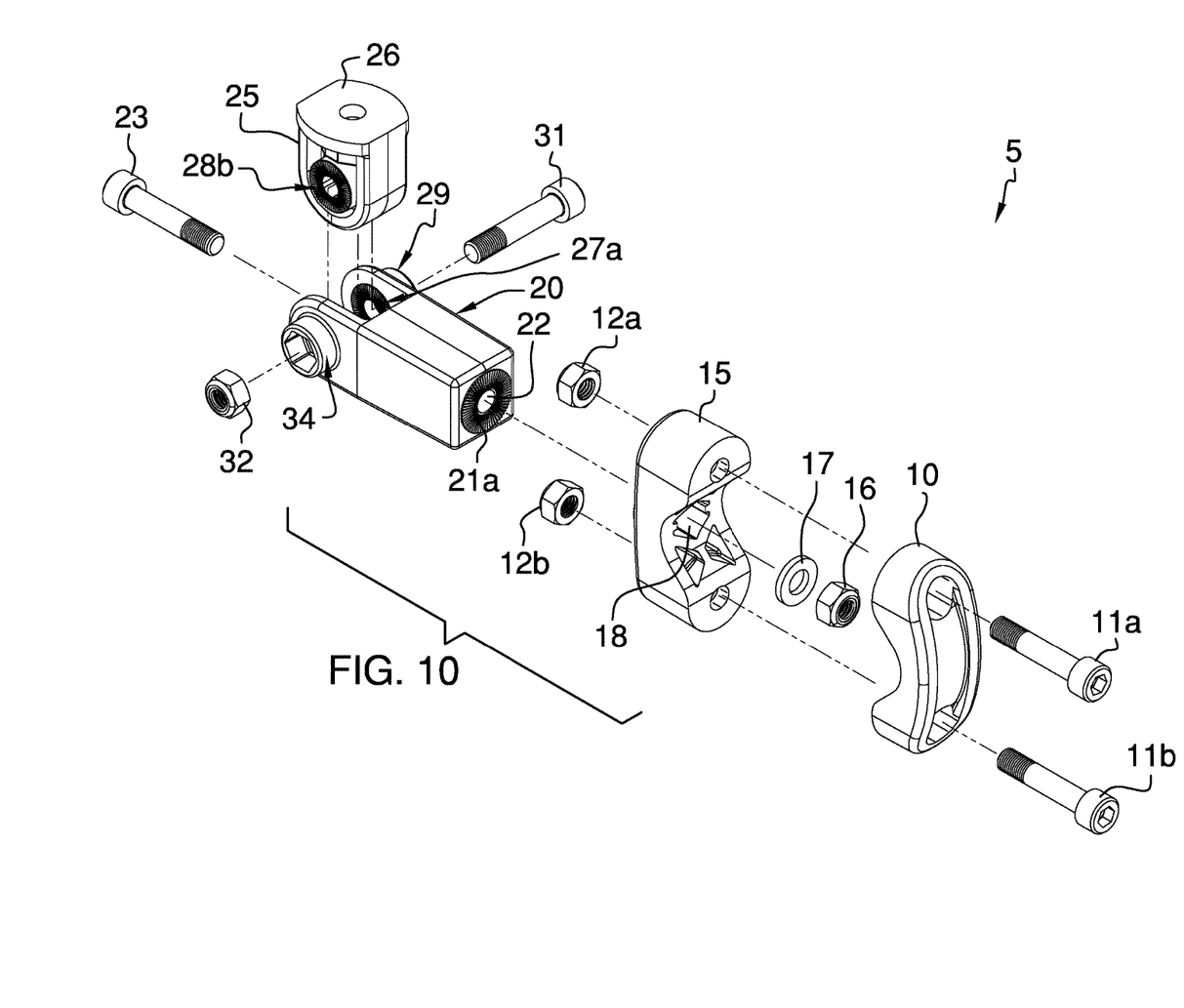
FIG. 10 is an exploded isometric view of the second embodiment of the device.

In this second embodiment, the locking pivot joint 29 is comprised of the extension arm 20 and pivot arm 25 joining together as shown in FIG. 10. Instead of a lock washer 33 being utilized as shown and taught in the first embodiment (see FIG. 9), a third serrated surface 27a and fourth serrated surface 27b are provided on the extension arm 20, and a fifth serrated surface 28a and sixth serrated surface 28b are provided on the pivot arm 25.

Figure 4:
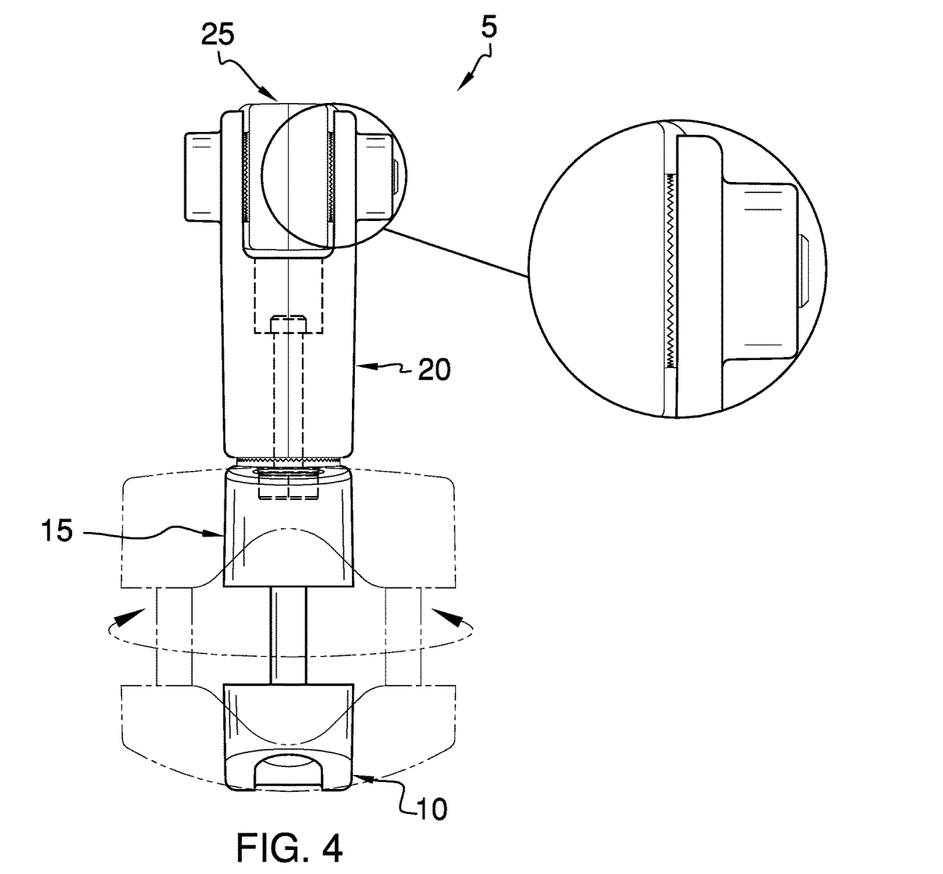
FIG. 4 is bottom view of the second embodiment of the device, which shows that the adjustable mounting clamp can rotate.
Figure 5:
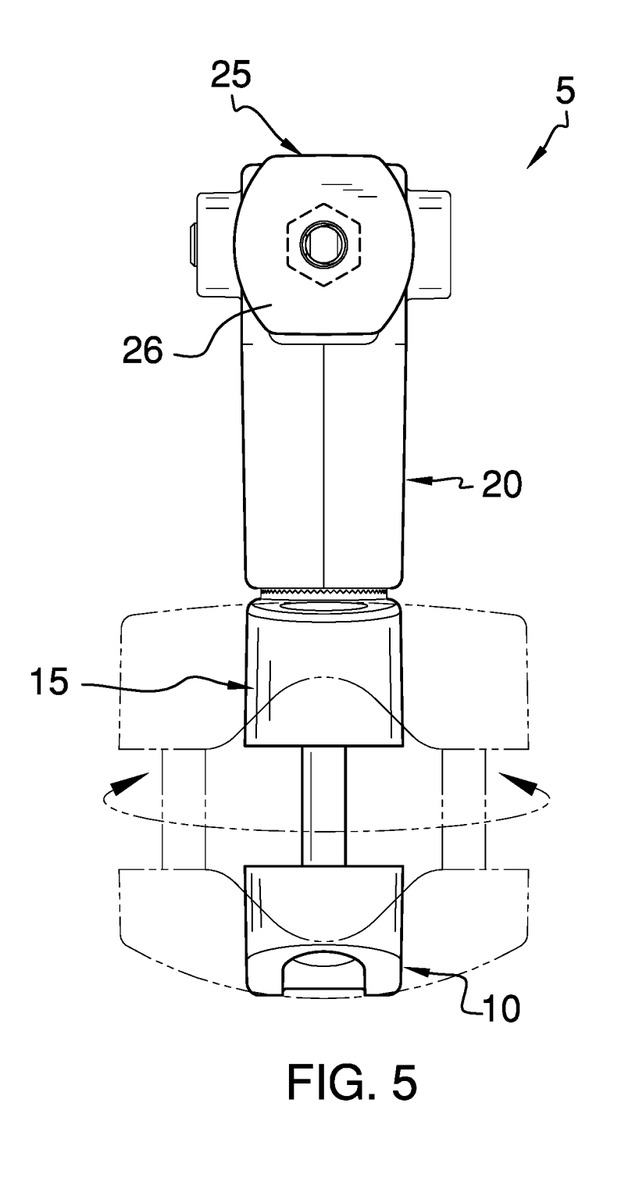
FIG. 5 is a top view of the device.
Figure 6:
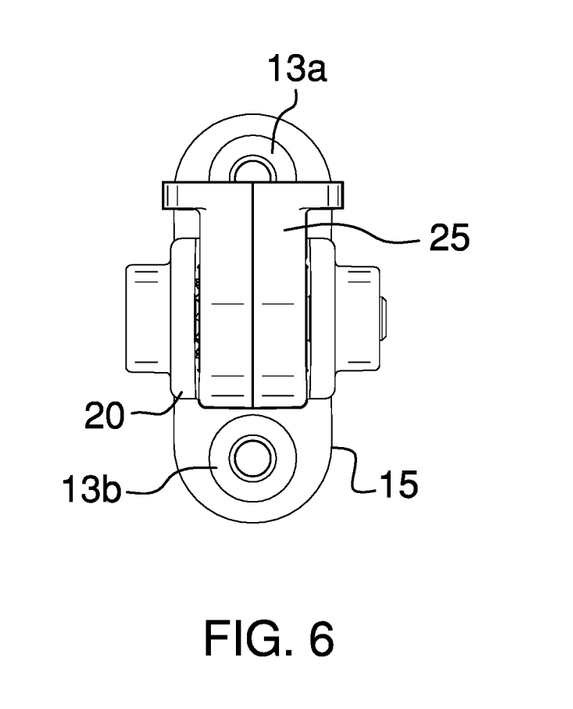
FIG. 6 is a front view of the first embodiment of the device.

The fourth bolt 31 is then placed through the extension arm 20, pivot arm 25, and threaded into a lock nut 32. Once the user positions the pivot arm 25 in the desired position relative the extension arm 20, the fourth bolt 31 is tightened into the nut 32. As the bolt 31 is tightened the third serrated surface 27a is compressed against the fifth serrated surface 28a and the fourth serrated surface 27b is compressed against the sixth serrated surface 28b. The third, fourth, fifth and sixth serrated surfaces join together as shown in FIG. 4. Accordingly, the pivot arm 25 is locked in place relative to the extension arm 20.

While the embodiments of the invention have been disclosed, certain modifications may be made by those skilled in the art to modify the invention without departing from the spirit of the invention.

The inventor claims:

1. A device which is comprised of:
   a. an adjustable mounting clamp;
      wherein the adjustable mounting clamp provides a first part;
      wherein the first part has a first through-hole;
      wherein the first part has a second through-hole;
      wherein the adjustable mounting clamp provides a second part;
      wherein the second part has a third through-hole;
      wherein the second part has a fourth through-hole;
      wherein the second part has a fifth through-hole;
      wherein the fifth through-hole has a first end and a second end;
      wherein the second part provides a serrated surface;
      wherein the adjustable mounting clamp provides a first bolt;
      wherein the adjustable mounting clamp provides a second bolt;
      wherein the adjustable mounting clamp provides a first lock nut;
   wherein the adjustable mounting clamp provides a second lock nut;
      wherein a third lock nut is recessed into the second part of the adjustable mounting clamp;
      wherein the fifth through-hole extends substantially from the third lock nut recess into the second part through the serrated surface of the second part;
      wherein the first lock nut threads onto the first bolt;
      wherein the second lock nut threads onto the second bolt.

2. The device described in claim 1, which is further comprised of:
   a. an extension arm;
      wherein the extension arm has a first end and a second end;
      wherein the extension arm provides a hollow interior;

wherein the extension arm has a serrated surface on the first end;
wherein a through-hole extends through the serrated surface and into the hollow interior;
wherein the extension arm has a first flange and a second flange;
wherein the first flange and second flange extend from the second end of the extension arm;
wherein the first flange has an interior side and an exterior side;
wherein the second flange has an interior side and an exterior side;
wherein the first flange has a through-hole;
wherein the second flange has a through-hole;
b. a pivot arm;
wherein the pivot arm has a first end and a second end;
wherein the pivot arm has a first side and a second side;
wherein the first end of the pivot arm is a contact surface;
wherein the second end of the pivot arm has a through-hole;
wherein the through-hole at the second end of the pivot arm, the through-hole within the first flange of the extension arm, and the through-hole within the second flange of the extension arm align;
c. a bolt;
wherein the bolt protrudes through the through-hole at the second end of the pivot arm, the through-hole within the first flange of the extension arm, and the through-hole within the second flange;
d. a nut;
wherein the nut threads onto the bolt.

3. The device claimed in claim 2 wherein a serrated lock washer is provided.

4. The device claimed in claim 2 wherein the first side of the pivot arm has a serrated surface.

5. The device claimed in claim 2 wherein the second side of the pivot arm has a serrated surface.

6. The device claimed in claim 2 wherein the interior side of the first flange has a serrated surface.

7. The device claimed in claim 2 wherein the interior side of the second flange has a serrated surface.

8. The device claimed in claim 1 wherein a second device can be attached to the third lock nut recessed into the second part of the adjustable mounting clamp while the adjustable mounting clamp is affected to a cylindrical surface.

9. A device which is comprised of:
a. an adjustable mounting clamp;
wherein the adjustable mounting clamp provides a first part;
wherein the first part has a first through-hole and a second through-hole;
wherein the adjustable mounting clamp provides a second part;
wherein the second part has a third through-hole, a fourth through-hole, and a fifth through-hole;
wherein the second part provides a first serrated surface;
wherein the fifth through-hole extends through the serrated surface;
wherein the adjustable mounting clamp provides a first bolt;
wherein the adjustable mounting clamp provides a second bolt;
wherein the adjustable mounting clamp provides a first lock nut;
wherein the adjustable mounting clamp provides a second lock nut;
wherein the adjustable mounting clamp provides a third lock nut;
wherein the third lock nut is recessed into the second
wherein a third bolt is provided within the hollow interior and protrudes through the fifth and sixth through-holes;
wherein the third lock nut is threaded onto the third bolt;
wherein the second part of the adjustable mounting clamp is joined with the first end of the extension arm;
wherein the first serrated surface mates with the second serrated surface;
wherein the extension arm has a first flange and a second flange;
wherein the first flange and second flange extend from the second end of the extension arm;
wherein the first flange has an interior side and an exterior side;
wherein the second flange has an interior side and an exterior side;
wherein the first flange has a seventh through-hole;
wherein the second flange has an eighth through-hole;
wherein the extension arm provides a slot on the second end of the extension arm between the first flange and the second flange;
c. a pivot arm;
wherein the pivot arm has a first end and a second end;
wherein the pivot arm has a first side and a second side;
wherein the first end of the pivot arm is a contact surface;
wherein the second end of the pivot arm has a ninth through-hole;
wherein the ninth through-hole at the second end of the pivot arm, the seventh through-hole within the first flange of the extension arm, and the eighth through-hole within the second flange of the extension arm align;
d. a fourth bolt;
wherein the fourth bolt is provided within the aligned seventh, eighth, and ninth through-holes;
e. a fourth nut;
wherein the fourth nut threads onto the fourth bolt.

10. The device claimed in 9 wherein the pivot arm is joined to the extension arm.

11. The device claimed in claim 9 wherein at least one serrated lock washer is provided.

12. The device claimed in claim 9 wherein the first side of the pivot arm has a serrated surface.

13. The device claimed in claim 9 wherein the second side of the pivot arm has a serrated surface.

14. The device claimed in claim 9 wherein the interior side of the first flange has a serrated surface.

15. The device claimed in claim 9 wherein the interior side of the second flange has a serrated surface.

16. The device claimed in claim 9 wherein the extension arm can be attached to the adjustable mounting clamp while the adjustable mounting clamp is affixed to a cylindrical surface.

* * * * *